(12) United States Patent
Talbot et al.

(10) Patent No.: US 8,609,575 B2
(45) Date of Patent: Dec. 17, 2013

(54) SULFUR RESISTANT EMISSIONS CATALYST

(75) Inventors: Peter Cade Talbot, Chapel Hill (AU); Jose Antonio Alarco, Indooroopilly (AU); Geoffrey Alan Edwards, St. Lucia (AU)

(73) Assignee: Very Small Particle Company Limited, Wacol (AU)

(*) Notice: Subject to any disclaimer, the term of this patent is extended or adjusted under 35 U.S.C. 154(b) by 879 days.

(21) Appl. No.: 12/296,896

(22) PCT Filed: Apr. 12, 2007

(86) PCT No.: PCT/AU2007/000488
§ 371 (c)(1),
(2), (4) Date: Mar. 3, 2009

(87) PCT Pub. No.: WO2007/115380
PCT Pub. Date: Oct. 18, 2007

(65) Prior Publication Data
US 2009/0202408 A1 Aug. 13, 2009

(30) Foreign Application Priority Data

Apr. 12, 2006 (AU) ................................ 2006901933
May 23, 2006 (AU) ................................ 2006902769

(51) Int. Cl.
*B01J 23/00* (2006.01)

(52) U.S. Cl.
USPC ........... 502/300; 502/302; 502/303; 502/304; 502/305; 502/306; 502/307; 502/308; 502/309; 502/313; 502/314; 502/315; 502/316; 502/317; 502/318; 502/321; 502/322; 502/323; 502/328; 502/329; 502/340; 502/341; 502/342; 502/343; 502/344; 502/345; 502/346; 502/347; 502/348; 502/349; 502/350; 502/351; 423/212

(58) Field of Classification Search
USPC ......... 502/355, 302–305, 306–309, 313–316, 502/317–318, 321–323, 328–329, 502/340–351; 423/212
See application file for complete search history.

(56) References Cited

U.S. PATENT DOCUMENTS

| 3,865,923 A | 2/1975 | Stephens .................... 423/213.2 |
| 3,884,837 A | 5/1975 | Remeika et al. ............... 252/462 |

(Continued)

FOREIGN PATENT DOCUMENTS

| GB | 1 511 333 A | 5/1978 |
| JP | 2004-321986 | 11/2004 |

(Continued)

OTHER PUBLICATIONS

International Search Report PCT/AU2007/000488 Dated Jun. 13, 2007.

(Continued)

*Primary Examiner* — Kaj K Olsen
*Assistant Examiner* — Pritesh Darji
(74) *Attorney, Agent, or Firm* — Winston & Strawn LLP

(57) ABSTRACT

A catalyst of one or more complex oxides having a nominal composition as set out in formula (1): $A_xB_{1-y-z}M_yP_zO_n$ (1) wherein A is selected from one or more group III elements including the lanthanide elements or one or more divalent or monovalent cations; B is selected from one or more elements with atomic number 22 to 24, 40 to 42 and 72 to 75; M is selected from one or more elements with atomic number 25 to 30; P is selected from one or more elements with atomic number 44 to 50 and 76 to 83; x is defined as a number where $0<x\leq 1$; y is defined as a number where $0\leq y<0.5$; and z is defined as a number where $0<z<0.2$.

18 Claims, 3 Drawing Sheets

(56) References Cited

U.S. PATENT DOCUMENTS

| | | | |
|---|---|---|---|
| 3,897,367 A | 7/1975 | Lauder | 252/462 |
| 4,001,371 A | 1/1977 | Remeika et al. | 423/213.2 |
| 4,049,583 A | 9/1977 | Lauder | 252/466 PT |
| 4,107,163 A | 8/1978 | Donohue | 423/263 |
| 4,126,580 A | 11/1978 | Lauder | 252/462 |
| 4,127,510 A | 11/1978 | Harrison et al. | 252/462 |
| 4,151,123 A | 4/1979 | McCann, III | 252/462 |
| 4,921,829 A | 5/1990 | Ozawa et al. | 502/302 |
| 5,318,937 A | 6/1994 | Jovanovic et al. | 502/303 |
| 5,380,692 A * | 1/1995 | Nakatsuji et al. | 502/303 |
| 5,939,354 A | 8/1999 | Golden | 502/525 |
| 5,977,017 A | 11/1999 | Golden | 502/525 |
| 6,351,425 B1 | 2/2002 | Porter | 365/225.7 |
| 6,352,955 B1 | 3/2002 | Golden | 502/302 |
| 6,372,686 B1 | 4/2002 | Golden | 502/302 |
| 6,569,803 B2 | 5/2003 | Takeuchi | 502/328 |
| 6,752,679 B1 | 6/2004 | Lui | 446/69 |
| 6,752,979 B1 * | 6/2004 | Talbot et al. | 423/592.1 |
| 7,169,196 B2 | 1/2007 | Wakefield | 44/354 |
| 7,195,653 B2 | 3/2007 | Hazarika et al. | 44/351 |
| 7,727,909 B2 * | 6/2010 | Alarco et al. | 438/785 |
| 2003/0154646 A1 | 8/2003 | Hazarika et al. | 44/321 |
| 2005/0066571 A1 | 3/2005 | Wakefield | 44/354 |
| 2006/0254130 A1 | 11/2006 | Scattergood | 44/457 |
| 2008/0028673 A1 | 2/2008 | Hazarika et al. | 44/354 |

FOREIGN PATENT DOCUMENTS

| | | |
|---|---|---|
| WO | WO 97/37760 | 10/1997 |
| WO | WO 2004/065529 A1 | 8/2004 |
| WO | WO2005070819 * | 8/2005 |
| WO | WO 2006/095557 A1 | 9/2006 |
| WO | WO 2007/115380 A1 | 10/2007 |

OTHER PUBLICATIONS

D. E. Angrove et al, "Position Dependent Phenomena During Deactivation of Three-Way Catalytic Converters on Vehicles", Catalysis Today, vol. 63, pp. 371-378 (2000).

International Search Reportand Written Opinion, PCT/AU2009/000050, mailed Feb. 26, 2009.

Du Pont De Nemours Co. *Catalyst With Perovskite Structure for Exhaust Gas Purification Containing Platinum and Non-Platinum Metals, Giving High Temperature Stability*, Derwent Abstract Accession No. 74485W/45, Oct. 30, 1975.

* cited by examiner

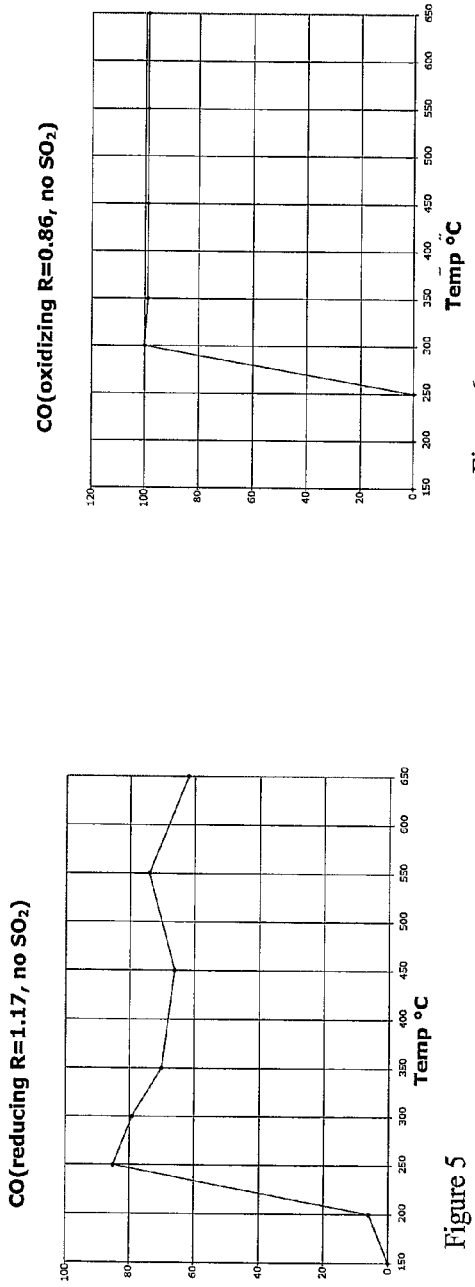
Figure 5
Figure 6
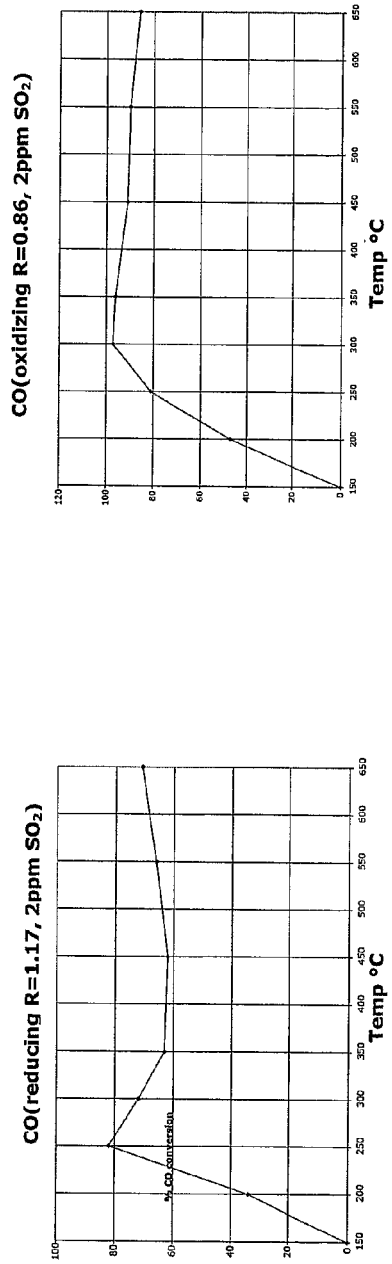
Figure 7
Figure 8

SULFUR RESISTANT EMISSIONS CATALYST

This application is a 371 filing of International Patent Application PCT/AU2007/000488 filed Apr. 12, 2007.

FIELD OF INVENTION

This invention generally relates to emission control catalysts and in particular to vehicle exhaust catalysts. The most commonly used emission catalyst is the "three-way catalyst" (TWC), so called because of simultaneous treatment of three harmful emissions, namely the oxidation of CO, the reduction of NOx to $N_2$ and the oxidation of unburnt hydrocarbons. In preferred embodiments, this invention relates to TWCs for both diesel and gasoline engines, having improved resistance to sulfur poisoning.

BACKGROUND TO THE INVENTION

Progressively stricter emission standards have resulted in the development of improved three-way catalysts by utilizing improved formulations and layered structures. Improvements in thermal stability and durability have also led to catalysts that can survive accelerated aging tests at temperatures of up to 1100° C.

One approach to improving catalyst performance has been to increase the quantity of platinum group metal (PGM) in the catalyst formulations. However, this in turn means an unacceptable increase in costs. Several methods have been used to overcome this problem. A Pd-only TWC catalyst has been developed (1) which uses palladium rather than platinum, to reduce costs. A further improvement to this concept reduces the amount of Pd by incorporating the Pd into a perovskite oxide (2). Palladium has a stronger tendency than Pt to undergo grain growth and hence becomes less active during high temperature operation. Incorporating the Pd into the perovskite structure during the oxidizing cycle of engine operation and in turn reducing the Pd to metal on the surface of the catalyst during the reducing cycle avoids excessive grain growth of the Pd. An additional advantage of using perovskite oxides is their high oxygen storage capacity (OSC), an essential property for good TWC performance. The OSC of certain perovskite has been shown to be even higher than $CeO_2$, the material most commonly used in TWC as the OSC component.

Perovskite oxides have been investigated for catalytic oxidation and reduction reactions associated with the control of automotive exhaust emissions since the early 1970's [6-15]. Perovskite catalysts incorporating different amounts of PGM have been disclosed in U.S. Pat. No. 3,865,923 by Stephens, U.S. Pat. Nos. 3,884,837 and 4,001,371 by Remeika et al., U.S. Pat. Nos. 3,897,367; 4,049,583 and 4,126,580 by Lauder, U.S. Pat. No. 4,107,163 by Donohue, U.S. Pat. No. 4,127,510 by Harrison, U.S. Pat. No. 4,151,123 by McCann, III, U.S. Pat. No. 4,921,829 by Ozawa et al., U.S. Pat. No. 5,318,937 by Jovanovic et al., U.S. Pat. No. 5,380,692 by Nakatsuji et al. and U.S. Pat. Nos. 5,939,354; 5,977,017; 6,352,955; 6,372,686 and 6,351,425 B2 by Golden.

Recent studies have shown that catalysts designed to meet low emission vehicle (LEV) and ultra low emission vehicle (ULEV)-type standards and contain reduced levels of PGM are significantly inhibited by sulfur in the fulel (3). A variety of factors influence the loss of catalytic performance due to sulfur. These factors include the level of sulfur in the fuel, the catalyst design, catalyst location and catalyst composition. The individual components of a TWC catalyst are the catalytic PGM, the OSC component and the support. All three of these components can be affected by sulfur.

In particular, efforts are being made to minimize the effects of sulfur on the PGM and the OSC components of the TWC materials. Palladium although lower cost, is more susceptible to sulfur poisoning than Pt and Rh. Research has shown (4) that metal-metal bonds can significantly reduce the affinity of these metals for $SO_2$. For example Pd/Rh is more tolerant to the presence of sulfur-containing molecules in the fuel than pure Pd catalysts.

$SO_2$ interacts with TWCs that have a ceria-containing component and it is the poisoning of the ceria that appears to be the primary problem associated with sulfur inhibition of these catalysts (5). To improve the sulfur tolerance and increase thermal stability, ceria is commonly mixed in solid solution with zirconia. A combination of ceria-zirconia can also enhance OSC at high operating temperatures.

While perovskite oxides can beneficially incorporate PGMs into their structure many perovskite compositions are susceptible to sulfur poisoning. Perovskite compositions typically incorporate transition metals such as copper, cobalt and manganese into the B site of the $ABO_3$ perovskite formula. Many of these transition metals form stable sulfates with $SO_2$.

U.S. Pat. No. 6,569,803 by Takeuchi claim a catalyst for purifying exhaust gas comprising a perovskite of the general formula ABO3 where the major proportion of the B site ion always includes an element from group consisting Mn, Co and Fe. However, no evaluation was made of resistance of these catalysts to $SO_2$.

In a comprehensive review of perovskites in catalysis L. G. Tejuca, J. L. J. Fierro and J. M. D. Tascon (16) report on extensive catalysis tests of perovskites using Mn, Co and Fe on the B site of the perovskite and concluded, "These results show that poisoning effects of $SO_2$ on these perovskites takes place through adsorption of this molecule on the B sites . . . . $SO_2$ may also interact with cations in position A, but this process does not result in deactivation of the catalyst". They go on to conclude that, "Although some progress has been attained in the preparation of highly active perovskites for CO and hydrocarbon oxidation and NO reduction by incorporation of noble metals (Pt and Ru) into the structure, the problem of $SO_2$ poisoning remains basically unsolved.

Further complications when incorporating perovskite oxides in TWC formulations included, maintaining phase purity of complex perovskite, achieving thermal stability and producing materials with the high surface areas necessary for good TWC performance at high operating temperatures.

It is an object of the present invention to provide a catalyst containing a perovskite component. The catalyst may be of high surface area, thermally stable, have reduced PGM component and show improved resistance to sulfur inhibition.

BRIEF DESCRIPTION OF THE INVENTION

In a first aspect, the present invention provides a catalyst comprising one or more complex oxides having a nominal composition as set out in formula (1):

$$A_xB_{1-y-z}M_yP_zO_n \qquad (1)$$

wherein
A is selected from one or more group III elements including the lanthanide elements or one or more divalent or monovalent cations;
B is selected from one or more elements with atomic number 22 to 24, 40 to 42 and 72 to 75;

M is selected from one or more elements with atomic number 25 to 30;
P is selected from one or more elements with atomic number 44 to 50 and 76 to 83;
x is defined as a number where $0<x\leq1$;
y is defined as a number where $0\leq y<0.5$; and
z is defined as a number where $0<z<0.2$.

In one embodiment, the one or more complex oxides have a general composition as set out in formula (2):

$$A_xA'_wB_{1-y-z}M_yP_zO_n \quad (2)$$

wherein
A is one or more group III elements including the lanthanide elements;
A' is one or more divalent or monovalent cations;
w is defined as a number where $0\leq w\leq1$;
$0.5<x+w<1$ and
B, M, P, x, y and z are as set out in formula (1).

In a preferred embodiment A is selected from La, Ce, Sm and Nd, A' is selected from Sr, Ba, and Ca, B is selected from Ti, V, W and Mo, M is selected from Cu and Ni, and P is selected from Pt, Pd Rh and Ru.

In a more preferred embodiment A is La and/or Ce, A' is Sr, B is Ti, M is Cu and/or Ni, P is selected from Pt and Rh or at least two of Pt, Pd, Rh and Ru. In this embodiment, the complex oxide has the general formula as set out in formula (3):

$$(La,Ce)_xSr_wTi_{1-y-z}M_yP_zO_n \quad (3)$$

wherein P is selected from Pt, Rh or at least two of Pt, Pd, Rh and Ru.

In a further preferred embodiment at least one of the complex oxide phases is a perovskite with a general formula (4):

$$A_xA'_wB_{1-y-z}M_yP_zO_3 \quad (4)$$

and more preferably of formula (5):

$$(La,Ce)_xSr_wTi_{1-y-z}M_y(Pt,Rh,Pd/Rh)_zO_3 \quad (5)$$

where the terms in (4) and (5) are as defined in (1) and (2) above.

The perovskite component of the formula may suitably exhibit substantially homogenous and phase-pure composition.

The complex oxide material may have an initial surface area greater than approximately 15 m²/g, preferably greater than approximately 20 m²/g, more preferably greater than approximately 30 m²/g, and a surface area after aging for 2 hours at 1000 C in air greater than approximately 5 m²/g, preferably greater than approximately 10 m²/g, more preferably greater than approximately 15 m²/g.

The complex oxide material may generally exhibit an average grain size of approximately 2 nm to approximately 150 nm, preferably approximately 2 to 100 nm and has pores ranging in size from approximately 7 nm to approximately 250 nm, more preferably approximately 10 nm to approximately 150 nm. However, the average grain and pore size of the complex oxide materials may vary, depending on the specific complex oxide selected.

More preferably, the complex oxide material may exhibit a substantially disperse pore size range.

The complex oxide material of the invention may be formed by mixing precursors of the elements described above in the general formula (1) followed by appropriate heat treatment to form the target phases. The precursors may be of any suitable form such as salts, oxides or metals of the elements used. The precursor mixture may be in the form of a mixture of solids, a solution or a combination of solids and solutions.

The solutions may be formed by dissolving salts in a solvent such as water, acid, alkali or alcohols. The salts may be but are not limited to nitrates, carbonates, oxides, acetates, oxalates, and chlorides. Organometallic form of elements such as alkoxides may also be used.

Solid dispersions may also be used as suitable precursor materials.

Various methods of mixing precursors to produce the complex oxide may include but are not limited to techniques such as, mixing and grinding, co-precipitation, thermal evaporative and spray pyrolysis, polymer and surfactant complex mixing and sol gel. Where necessary, the final phase composition is achieved by thermal processing following mixing. The heating step may be carried out using any suitable heating apparatus and may include but are not limited to, hot plates or other heated substrates such as used in spray pyrolysis, ovens stationary table furnaces, rotary furnaces, induction furnaces, fluid bed furnace, bath furnace, flash furnace, vacuum furnace, rotary dryers, spray dryers, spin-flash dryers.

In a preferred embodiment a homogeneous complex oxide is formed by the method outlined in U.S. Pat. No. 6,752,979, "Production of Fine-Grained Particles", the entire contents of which are herein incorporated by cross reference.

In a further preferred embodiment a homogeneous complex oxide is formed, has nano-sized grains in the size range indicated and nano-scale pores in the size range indicated by using the method outlined in U.S. Pat. No. 6,752,979 and U.S. Patent application 60/538,867, the entire contents of which are herein incorporated by cross reference.

In a more preferred embodiment a homogeneous complex oxide is formed, has nano-sized grains in the size range indicated and nano-scale pores in the size range indicated and uses an aqueous colloidal dispersion of nano-scale particles as one of the precursor elements by using the method outlined in U.S. Pat. No. 6,752,979, and U.S. Patent application 60/538,867 and U.S. patent application 60/582,905, the entire contents of which are herein incorporated by cross reference.

In a second aspect, the present invention provides a three way catalyst incorporating the catalyst as described with reference to the first aspect of the present invention.

In a third aspect, the present invention provides a method for treating an exhaust gas by causing the exhaust gas to come into contact with a catalyst in accordance with the first aspect of the present invention. Suitably, the catalyst caused oxidation of CO and hydrocarbons in the exhaust gas and reduction of nitrogen oxides to $N_2$ in the exhaust gas.

The present invention also provides an automotive catalytic converter including a catalyst in accordance with the first aspect of the present invention.

BRIEF DESCRIPTION OF THE DRAWINGS

FIG. 5 shows a graph of CO conversion vs temperature, as obtained from Example 9;
FIG. 6 shows a graph of CO conversion vs temperature, as obtained from Example 10;
FIG. 7 shows a graph of CO conversion vs temperature, as obtained from Example 11;

FIG. 8 shows a graph of CO conversion vs temperature, as obtained from Example 12;

EXAMPLES

Catalyst Preparation

Example 1

Figure 1:
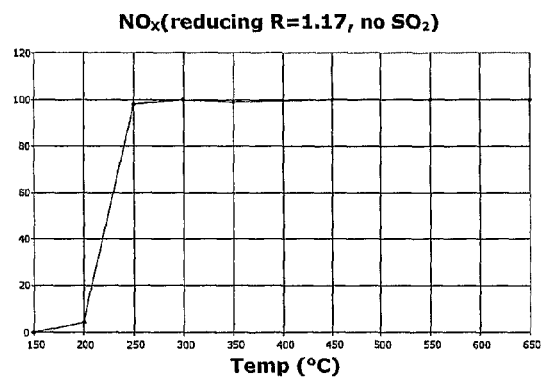
FIG. 1 shows a graph of NOx conversion vs temperature, as obtained from Example 5.

A complex metal oxide of the nominal formula $La_{0.8}Sr_{0.2}Ti_{0.9762}Pd_{0.0117}Rh_{0.0121}O_n$ plus 10% $CeO_2$ was produced as follows.

A solution containing all the required elements except Ti was made by mixing 45 mls of water, 10 g of nitric acid, 46 g of lanthanum nitrate hexahydrate, 5.62 g of strontium nitrate, 1.65 g of pd nitrate 10% solution and 0.53 g of rhodium nitrate.

Titanium-based nano-particles were added to the solution and stirred at a temperature of 50° C. until the particles were dispersed and a clear solution was formed.

The solution was then added to 16 g of carbon black and mixed with a high-speed stirrer. The resulting mixture was added to 70 g of anionic surfactant and again mixed with a high-speed stirrer.

The final mixture was heat treated slowly to 650° C. and then treated at 800° C. for 2 hrs and a further 2 hrs at 1000° C. XRD analysis showed that the perovskite phase $LaSr_{0.5}Ti_2O_6$ and $(Ce,La)_2Ti_2O_7$ were the main types of phases present in Example 1.

Example 2

A complex metal oxide of nominal formula $La_{0.5}Sr_{0.25}Ti_{0.942}Pd_{0.018}Ni_{0.04}O_n$ was produced using a similar method to Example 1. XRD analysis showed that the perovskite phase $LaSr_{0.5}Ti_2O_6$ and $(Ce,La)_2Ti_2O_7$ were the main types of phases present.

Example 3

A complex metal oxide of nominal formula $La_{0.8}Sr_{0.2}Ti_{0.936}Pd_{0.024}Ni_{0.04}O_n$ plus 10% $CeO_2$ was produced using a similar method to Example 1. XRD analysis showed that the perovskite phase $LaSr_{0.5}Ti_2O_6$ and $(Ce,La)_2Ti_2O_7$ were the main types of phases present.

Example 4

A complex metal oxide of nominal formula $La_{0.8}Sr_{0.2}Ti_{0.9}Pd_{0.03}Ni_{0.04}Cu_{0.03}O_n$ plus 10% $CeO_2$ was produced using a similar method to Example 1. XRD analysis showed that the perovskite phase $LaSr_{0.5}Ti_2O_6$ and $(Ce,La)_2Ti_2O_7$ were the main types of phases present.

Catalyst Characterization and Testing

Sample phase identification and morphology were characterized using Xray diffraction (XRD), transmission electron microscopy (TEM) and scanning electron microscopy. Surface area and pore size distribution data were obtained using a Micromeritics Tristar surface area analyser.

The following data were collected for the sample composition given in Example 1. The surface areas as measured for a range of temperatures are as follows:

| Surface area (BET) | Temperature | Time |
|---|---|---|
| 33.06 m²/g | 650° C. | 0.5 hr |
| 23.86 m²/g | 800° C. | 2 hr |
| 15.18 m²/g | 1000° C. | 2 hr |

Tests of Threeway Catalytic Activity
Sample Preparation

Raw catalyst powder is pelletized with a hydraulic press at 2000 psi. The pellets are broken up and sieved. The size fraction in the range 0.5-1 mm (nominal) is retained as the sample. Catalyst samples with weight of 0.25 g±0.02 g are inserted into ¼ inch stainless steel reactor tubes to achieve a bed height of 20 mm and are held in place with quartz wool. A thermocouple tip penetrates the bed to monitor temperature.

Ageing of Samples

Prior to testing samples are aged for 6 hrs @1000° C. in the feed gas mixtures given below oscillating from reducing to oxidizing composition with a frequency of 0.33 Hz.

Feed Gas Composition and Distribution

Based on the bed volume indicated the gases are supplied at a gas hourly space velocity (GHSV) of 63000 $h^{-1}$. A gas composition containing 2 ppm $SO_2$ was used to simulate sulfur levels of approx. 30 ppm in gasoline. These levels of sulfur are also representative of levels in diesel fuels under the proposed low sulfur limits for 2007 (17).

Gas ratios were adjusted to achieve two specific values for $R^+$ for these tests;

R=0.86, oxidizing conditions.
R=1.17, reducing conditions.

The gas compositions are as follows:

| R = 0.86 Oxidising | | R = 1.17 reducing | |
|---|---|---|---|
| Species | PPM | Species | PPM |
| NO | 1500 | NO | 1500 |
| CO | 13500 | CO | 13500 |
| $CO_2$ | 210000 | $CO_2$ | 210000 |
| HC | 750 | HC | 750 |
| $H_2O$ | 125000 | $H_2O$ | 125000 |
| $O_2$ | 8407 | $O_2$ | 5981 |
| $SO_2$ | 2 | $SO_2$ | 2 |
| $N_2$ | balance | $N_2$ | balance |

⁺Where R is the redox potential of the feed composition gas. R is approximated as $\{3C_{HC} + C_{co}\}/\{C_{NO} + 2C_{O2}\}$ wherein C represents the concentration of the gases.

Given the desired composition of the feed gas, the gas hourly space velocity (GHSV) and cylinder gas compositions, the required flow rate of each species is calculated. With the exception of water vapor, mass flow controllers (MFCs) (MKS Instruments, Inc) are used to obtain the desired flow rates for each species.

Liquid water is accurately pumped (Gilson Model 307) into a heated zone, where it is vaporized and entrained in a MFC controlled nitrogen stream. After exiting their respective MFCs, the gases are mixed in a manifold and distributed to three reactors. The flow rate through each reactor is adjusted using a needle valve on the outlet of each reactor to ensure equal flow through all reactors Exhaust Gas Analysis After the desired reactor conditions are stabilized, exhaust gases from the reactor are analyzed. The gas stream is conditioned using a Perma Pure dryer. A multiport valve directs the exhaust gas from each reactor to instruments to measure NO, $N_2O$, CO, $CO_2$, $O_2$ and HC using a Shimadzu 17A Gas Chromatograph. Concentrations of NO and CO were simultaneously monitored using a chemiluminescence NO detector and infrared CO detector. A blank reactor is run in parallel as reference. Samples are pretreated for 1 hr at 650° C. at R=1.17 before commencing experiments.

Catalyst Performance

NOx Conversion

Example 5

A sample with the composition of Example 1 was tested for its three way catalytic activity under conditions that closely simulate exhaust gas compositions during the reducing cycle of engine activity. FIG. 1 shows NOx conversion for 0.25 g of catalyst of the above composition tested in a gas hourly space velocity (GHSV) flow rate of 300,000 $h^{-1}$. The gas composition was NO 1500 ppm, CO 13500 ppm, $CO_2$ 210000 ppm, HC 750 ppm, $H_2O$ 125000 ppm, $O_2$ 5981 ppm $N_2$ Balance of gas. No SO2 was used in this test. The data show that the catalyst becomes active at temperatures as low as 200° C. By 250° C. the catalyst has achieved virtually total conversion of 98-100%. Full conversion was maintained to a maximum test temperature of 650° C.

Example 6

Figure 2:
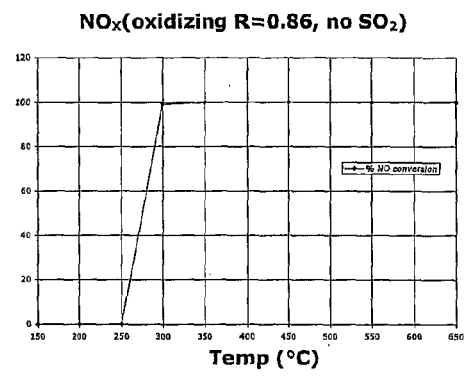
FIG. 2 shows a graph of NOx conversion vs temperature, as obtained from Example 6.

The sample of Example 5 was again tested for NOx conversion but under simulated oxidizing exhaust conditions. FIG. 2 shows NOx conversion for 0.25 g of catalyst of the above composition tested in a gas hourly space velocity (GHSV) flow rate of 300,000 $h^{-1}$. The gas composition was NO 1500 ppm, CO 13500 ppm, $CO_2$ 210000 ppm, HC 750 ppm, $H_2O$ 125000 ppm, $O_2$ 8407 ppm $N_2$ Balance of gas. No $SO_2$ was used in this test. The data show that the catalyst becomes active at temperatures between 250° C.-300° C. By 300° C. the catalyst has achieved full NOx conversion, which is maintained to a maximum test temperature of 650° C.

Example 7

Figure 3:
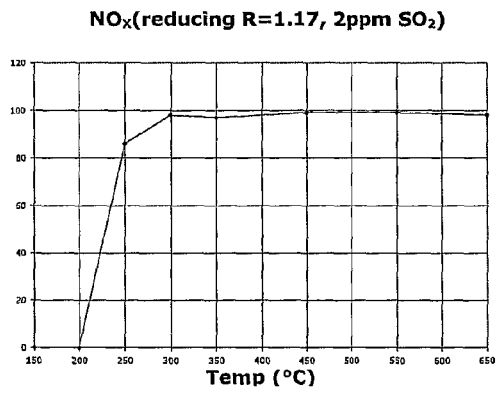
FIG. 3 shows a graph of NOx conversion vs temperature, as obtained from Example 7.

The sample of Example 5 was again tested for NOx conversion but under simulated reducing exhaust conditions containing $SO_2$. FIG. 3 shows NOx conversion for 0.25 g of catalyst of the above composition tested in a gas hourly space velocity (GHSV) flow rate of 300,000 $h^{-1}$. The gas composition was NO 1500 ppm, CO 13500 ppm, $CO_2$ 210000 ppm, HC 750 ppm, $H_2O$ 125000 ppm, $O_2$ 5981 ppm, $SO_2$ 2 ppm, $N_2$ Balance of gas. The data show that the catalyst becomes active at temperatures between 200° C.-250° C. By 250° C. the catalyst has achieved 86% NOx conversion. Full conversion (98%-100%) is achieved by 300° C. and maintained to a maximum test temperature of 650° C.

Example 8

Figure 4:
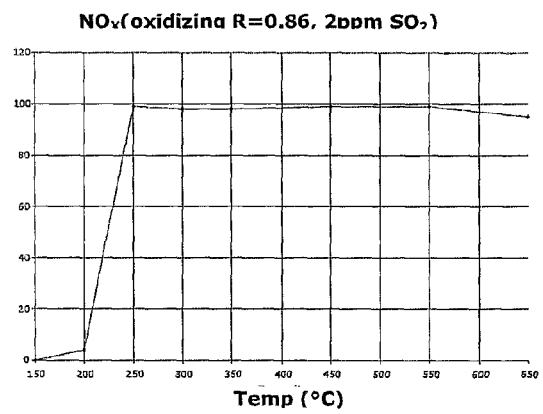
FIG. 4 shows a graph of NOx conversion vs temperature, as obtained from Example 8.

The sample of Example 5 was again tested for NOx conversion but under simulated oxidizing exhaust conditions containing $SO_2$. FIG. 4 shows NOx conversion for 0.25 g of catalyst of the above composition tested in a gas hourly space velocity (GHSV) flow rate of 300,000 $h^{-1}$. The gas composition was NO 1500 ppm, CO 13500 ppm, $CO_2$ 210000 ppm, HC 750 ppm, $H_2O$ 125000 ppm, $O_2$ 8407 ppm, $SO_2$ 2 ppm, $N_2$ Balance of gas. The data show that the catalyst becomes active at very low temperatures of between 150° C. and 200°. By 250° C. the catalyst has achieved full NOx conversion. Full conversion (98%-100%) is maintained to 550° C. Between 550° C. and 650 C a slight drop in conversion to 95% was observed.

These four results show the excellent performance of this catalyst with almost no inhibition of the performance by $SO_2$ in the gas stream.

CO Oxidation

Example 9

The composition of Example 1 was tested for its three way catalytic activity under conditions that closely simulate exhaust gas compositions during the reducing cycle of engine activity. FIG. 5 shows CO conversion for 0.25 g of catalyst of the above composition tested in a gas hourly space velocity (GHSV) flow rate of 300,000 $h^{-1}$. The gas composition was NO 1500 ppm, CO 13500 ppm, $CO_2$ 210000 ppm, HC 750 ppm, $H_2O$ 125000 ppm, $O_2$ 5981 ppm $N_2$ Balance of gas. No $SO_2$ was used in this test. The data show that the catalyst becomes active between 150° C. and 200°. By 250° C. a maximum conversion of 85% is obtained. CO oxidation drops to 66% as temperature is increased to 450° C. Conversion again increases to 74% at 550° C. but drops to 62% at 650° C.

Example 10

The sample of Example 9 was again tested for CO conversion but under simulated oxidizing exhaust conditions. FIG. 6 shows CO conversion for 0.25 g of catalyst of the above composition tested in a gas hourly space velocity (GHSV) flow rate of 300,000 $h^{-1}$. The gas composition was NO 1500 ppm, CO 13500 ppm, $CO_2$ 210000 ppm, HC 750 ppm, $H_2O$ 125000 ppm, $O_2$ 8407 ppm $N_2$ Balance of gas. No $SO_2$ was used in this test. The data show that the catalyst becomes active at temperatures between 250° C.-300° C. By 300° C. the catalyst has 100% CO oxidation, which is maintained to a maximum test temperature of 650° C.

Example 11

The sample of Example 9 was again tested for CO oxidation but under simulated reducing exhaust conditions containing $SO_2$. FIG. 7 shows CO oxidation for 0.25 g of catalyst of the above composition tested in a gas hourly space velocity (GHSV) flow rate of 300,000 $h^{-1}$. The gas composition was NO 1500 ppm, CO 13500 ppm, $CO_2$ 210000 ppm, HC 750 ppm, $H_2O$ 125000 ppm, $O_2$ 5981 ppm, $SO_2$ 2 ppm, $N_2$ Balance of gas. The data show that the catalyst becomes active at an extremely low temperature with up to 34% conversion at temperatures between 150° C.-200° C. By 250° C. the catalyst has achieved 82% CO oxidation. CO oxidation drops to 62% as temperature is increased to 350° C. Conversion progressively increases from 350° C. to a value of 71% at 650° C.

Example 12

The sample of Example 9 was again tested for CO oxidation but under simulated oxidizing exhaust conditions containing $SO_2$. FIG. 8 shows CO oxidation for 0.25 g of catalyst of the above composition tested in a gas hourly space velocity (GHSV) flow rate of 300,000 h$^{-1}$. The gas composition was NO 1500 ppm, CO 13500 ppm, $CO_2$ 210000 ppm, HC 750 ppm, $H_2O$ 125000 ppm, $O_2$ 8407 ppm, $SO_2$ 2 ppm, $N_2$ Balance of gas. The data show that the catalyst becomes active at very low temperatures of between 150° C. and 200°. By 200° C. the catalyst has achieved 47% CO oxidation. A maximum of 97% CO oxidation is achieved by 300° C. Between 300° C. and 650 C a gradual drop in conversion to 86% was observed.

These data confirm that this catalyst performs well for CO oxidation in an exhaust gas stream containing $SO_2$.

HC Oxidation

Example 13

Figure 9:
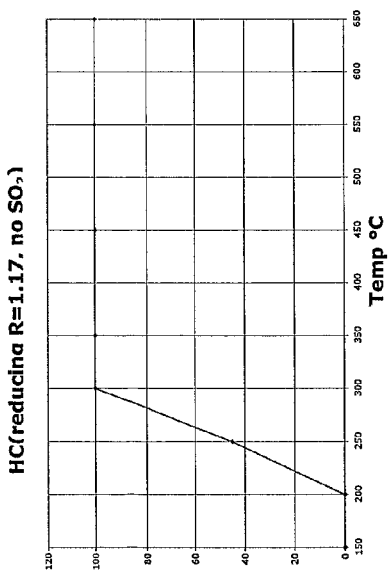
FIG. 9 shows a graph of hydrocarbon (HC) conversion vs temperature, as obtained from Example 13.

The composition of Example 1 was tested for its three way catalytic activity under conditions that closely simulate exhaust gas compositions during the reducing cycle of engine activity. FIG. 9 shows HC oxidation for 0.25 g of catalyst of the above composition tested in a gas hourly space velocity (GHSV) flow rate of 300,000 h$^{-1}$. The gas composition was NO 1500 ppm, CO 13500 ppm, $CO_2$ 210000 ppm, HC 750 ppm, $H_2O$ 125000 ppm, $O_2$ 5981 ppm $N_2$ Balance of gas. No $SO_2$ was used in this test. The data show that the catalyst becomes active between 200° C. and 250°. By 250° C. HC oxidation of 45% is obtained. By 300° C. 100% oxidation is achieved and is maintained up to the maximum test temperature of 650° C.

Example 14

Figure 10:
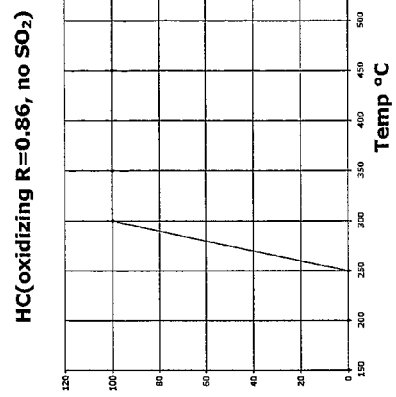
FIG. 10 shows a graph of hydrocarbon (HC) conversion vs temperature, as obtained from Example 14.

The sample of Example 13 was again tested for HC oxidation but under simulated oxidizing exhaust conditions. FIG. 10 shows HC oxidation for 0.25 g of catalyst of the above composition tested in a gas hourly space velocity (GHSV) flow rate of 300,000 h$^{-1}$. The gas composition was NO 1500 ppm, CO 13500 ppm, $CO_2$ 210000 ppm, HC 750 ppm, $H_2O$ 125000 ppm, $O_2$ 8407 ppm $N_2$ Balance of gas. No $SO_2$ was used in this test. The data show that the catalyst becomes active at temperatures between 250° C.-300° C. By 300° C. the catalyst has 100% CO oxidation, which is maintained to a maximum test temperature of 650° C.

Example 15

Figure 11:
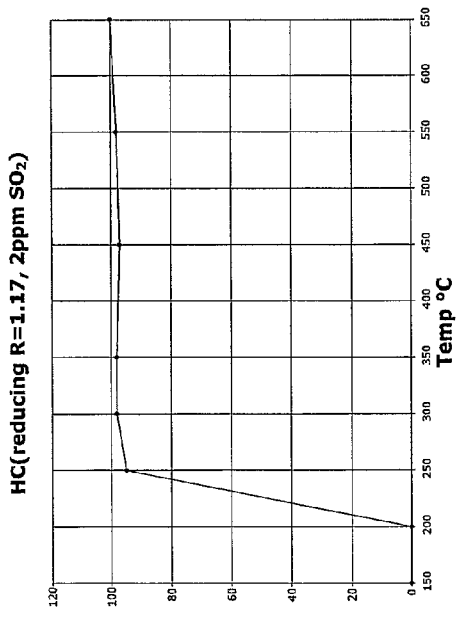
FIG. 11 shows a graph of hydrocarbon (HC) conversion vs temperature, as obtained from Example 15.

The sample of Example 13 was again tested for HC oxidation but under simulated reducing exhaust conditions containing $SO_2$. FIG. 11 shows HC oxidation for 0.25 g of catalyst of the above composition tested in a gas hourly space velocity (GHSV) flow rate of 300,000 h$^{-1}$. The gas composition was NO 1500 ppm, CO 13500 ppm, $CO_2$ 210000 ppm, HC 750 ppm, $H_2O$ 125000 ppm, $O_2$ 5981 ppm, $SO_2$ 2 ppm, $N_2$ Balance of gas. The data show that the catalyst becomes active between 200° C.-250° C. By 250° C. the catalyst has achieved 95% oxidation of HC. This value increases to between 98%-100% and is maintained over the temperature range tested.

Example 16

Figure 12:
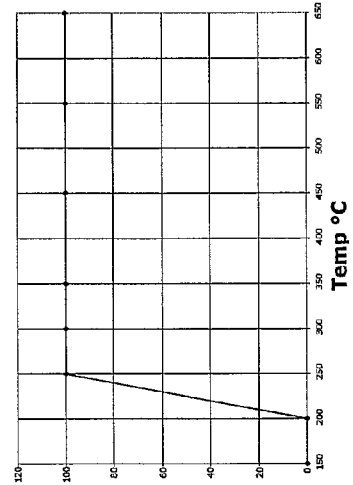
FIG. 12 shows a graph of hydrocarbon (HC) conversion vs temperature, as obtained from Example 16.

The sample of Example 13 was again tested for HC oxidation but under simulated oxidizing exhaust conditions containing $SO_2$. FIG. 12 shows CO oxidation for 0.25 g of catalyst of the above composition tested in a gas hourly space velocity (GHSV) flow rate of 300,000 h$^{-1}$. The gas composition was NO 1500 ppm, CO 13500 ppm, $CO_2$ 210000 ppm, HC 750 ppm, $H_2O$ 125000 ppm, $O_2$ 8407 ppm, $SO_2$ 2 ppm, $N_2$ Balance of gas. The data show that the catalyst exhibits 100% HC oxidation by 250° C. and this value is maintained over the tested temperature range.

These data indicate that not only does the catalyst show excellent performance with $SO_2$ in the gas stream but light-off temperatures were up to 50° C. lower.

The present invention provides a catalyst for promoting oxidation-reduction reactions of exhaust gases containing nitrogen oxides, carbon monoxide and unburnt hydrocarbons. The catalyst may exhibit increased resistance to sulphur poisoning. In some embodiments, the catalyst of the present invention is especially suitable for use as a three way catalyst for use in automotive applications. The catalyst is suitably a highly heat resistant catalyst containing complex oxides and PGM, which exhibits resistance to a decrease in specific surface at elevated operating temperatures. Most suitably, embodiments of the present invention provide a highly heat resistant catalyst containing complex oxides and PGM which is resistant to inhibition by $SO_2$ in the exhaust gas stream.

REFERENCES

1. J. S. Hepburn, K. S. Patel, M. G. Meneghel, H. S. Gandhi, Engelhard Dev. Team, Johnson Matthey Dev. Team, "Development of Pd-only Three Way Catalyst Technology", SAE 941058 (1994).
2. S. J. Golden, A. D. Polli, R. Hatfield, M. G. Cotton, T. J. Truex, Catalytic Solutions Inc., "Advanced low Platinum Group metal Three-Way Catalyst for Tier 2 and LEV Compliance", 2001010659 (2001).
3. "The Impact of Gasoline Fuel Sulfur on Catalytic Control Systems", report by Manufacturers of Emission Controls Association (MECA), (1998).
4. J. A. Rodriguez, J. Hrbek, T. Jirsak, J. Hanson, S. Chaturvedi, J. L. Brito, "Chemistry of SO2 and Organosulfur on Metal and Oxide Surfaces: Unraveling the Mystery behind Catalyst poisoning and Desulfurization" *Accts. Chem. Res.* 32, 719-728 (1999)
5. R. J. Gorte and T. Luo, "SO2 poisoning of ceria-supported, metal catalysts, In, "Catalysis by Ceria and Related Materials", edited by A. Trovarelli, Imperial College Press, 2002, p 377-389.
6. D. B. Meadowcroft, "Low-Cost Oxygen Electrode Materials", Nature (London) 226 (1970) pp 847-48.
7. W. F. Libby, "Promising Catalyst for Auto Exhaust", Science 171 [3970] (1971) pp 449-50.
8. R. J. H. Voorhoeve, J. P. Remeika, P. E. Freeland and B. T. Matthias, "Rare-Earth Oxides of Manganese and Cobalt Rival Platinum for the Treatment of Carbon Monoxide in Auto Exhaust", Science 177 [4046] (1972) pp 353-54.
9. R. J. H. Voorhoeve, J. P. Remeika and D. W. Johnson, Jr., "Rare-Earth Manganites: Catalysts with Low Ammonia Yield in the Reduction of Nitrogen Oxides", Science 180 [4081] (1973) pp 62-64.
10. D. W. Johnson, Jr. and P. K. Gallagher, "Studies of Some Perovskite Oxidation Catalysts Using DTA Techniques", ThermochimicaActa 7 [4] (1973) pp 303-09.
11. P. K. Gallagher, D. W. Johnson, Jr. and F. Schrey, "Supported Perovskite Oxidation Catalysts", Materials Research Bulletin 9 [10] (1974) pp 1345-52.
12. R. J. H. Voorhoeve, J. P. Remeika and L. E. Trimble, "Perovskites containing Ruthenium as Catalysts for Nitric Oxide Reduction", Materials Research Bulletin 9 [10] (1974) pp 1393-404.

13. S. C. Sorenson, J. A. Wronkiewicz, L. B. S and G. P. Wirtz, "Properties of LaCO₃ as a Catalyst in Engine Exhaust Gases", American Ceramic Society Bulletin 53 [5] (1974) pp 446-49.
14. P. K. Gallagher, D. W. Johnson, Jr., J. P. Remeika, F. Schrey, L. E. Trimble, E. M. Vogel and R. J. H. Voorhoeve, "Activity of $La_{0.7}Sr_{0.3}MnO_3$ without Pt and $La_{0.7}Pb_{0.3}MnO_3$ with varying Pt Contents for the Catalytic Oxidation of CO", Materials Research Bulletin 10 [6] (1975) pp 529-38.
15. D. W. Johnson, Jr., P. K. Gallagher, F. Schrey and W. W Rhodes, "Preparation of High Surface Area Substituted LaMnO₃ Catalysts", Ceramic Bulletin 55 [5] (1976) pp 520-27.
16. L. G. Tejuca, J. L. G. Fierro and J. M. D. Tascon, "Structure and Reactivity of Perovskite Type Oxides", Advances in Catalysis 36 (1989) pp 237-328.
17. "Catalyst-Based Diesel Particulate Filters and NOx Adsorbers: A Summary of the Technologies and the Effects of Fuel Sulfir", report by Manufacturers of Emission Controls Association (MECA), (Aug. 14, 2000).

The invention claimed is:

1. A complex metal oxide catalyst having resistance to loss of activity due to contact with sulfur for treating an exhaust gas containing sulphur or sulphur compounds, nitrogen oxides (NOx), carbon monoxide (CO) and hydrocarbons, the catalyst comprising one or more complex oxides having a nominal composition as set out in formula (1):

$$A_xA'_wB_{1-y-z}M_yP_zO_n \quad (1)$$

wherein:
A is selected from one or more group III elements including the lanthanide elements;
A' is selected from Sr, Ba, and Ca;
B is selected from Ti, V, W and Mo;
M is selected from one or more elements with atomic number 25 to 30;
P is selected from one or more elements with atomic number 44 to 50 and 76 to 83;
x is defined as a number where $0<x\leq 1$;
w is defined as a number where $0<w\leq 1$;
$0.5<x+w\leq 1$;
y is defined as a number where $0\leq y<5$;
z is defined as a number where $0<z<0.2$; and
n is a number that gives charge neutrality.

2. The catalyst of claim 1, wherein A is selected from the group consisting of La, Ce, Sm and Nd, M is selected from the group consisting of Cu and Ni, and P is selected from the group consisting of Pt, Pd, Rh and Ru.

3. The catalyst of claim 1, wherein A is La and/or Ce, A' is Sr, B is Ti, M is Cu and/or Ni, P is selected from the group consisting of Pt and Rh or at least two of Pt, Pd, Rh and Ru, and the complex oxide has the general formula as set out in formula (2):

$$(La,Ce)_xSr_wTi_{1-y-z}M_yP_zO_n \quad (2)$$

4. The catalyst of claim 1, wherein at least one of the one or more complex oxides is a perovskite with a general formula (3):

$$A_xA'_wB_{1-y-z}M_yP_zO_3 \quad (3)$$

5. The catalyst of claim 4, wherein at least one of the one or more complex oxides is a perovskite with a general formula (4):

$$A_xSr_wTi_{1-y-z}M_yP_zO_3 \quad (4),$$

wherein A is La and/or Ce, and P is selected from the group consisting of Pt, Rh and Pd/Rh.

6. The catalyst of claim 4, wherein the perovskite component of the formula exhibits substantially homogenous and phase-pure composition.

7. The catalyst of claim 1, wherein the complex oxide material has an initial surface area greater than approximately 15 m²/g.

8. The catalyst of claim 7, wherein the complex oxide material has a surface area after aging for 2 hours at 1000° C. in air greater than approximately 5 m²/g.

9. The catalyst of claim 1, wherein the complex oxide material exhibits an average grain size of approximately 2 nm to approximately 150 nm.

10. The catalyst of claim 1, wherein the complex oxide material has pores ranging in size from approximately 7 nm to approximately 250 nm.

11. The catalyst of claim 1, wherein the complex oxide material exhibits a substantially disperse pore size range.

12. The catalyst of claim 1, having a perovskite phase and another complex metal oxide phase.

13. The catalyst of claim 12, wherein the other complex metal oxide phase exhibits a $(Ce,La)_2Ti_2O_7$ phase.

14. The catalyst of claim 1, having the nominal formula:

$$La_{0.9}Sr_{0.2}Ti_{0.9762}Pd_{0.0117}Rh_{0.0121}O_n \text{ plus } 10\% \text{ CeO}_2.$$

15. The catalyst of claim 14, wherein the complex metal oxide has both a perovskite phase of $LaSr_{0.5}Ti_2O_6$ and another phase of $(Ce,La)_2Ti_2O_7$.

16. A method for treating an exhaust gas containing sulphur or sulphur compounds, nitrogen oxides (NOx), carbon monoxide (CO) and hydrocarbons, which comprises causing the exhaust gas to contact the catalyst of claim 1.

17. The method of claim 16, wherein the exhaust gas is treated by the catalyst oxidizing the carbon monoxide (CO) and hydrocarbons therein.

18. The method of claim 16, wherein the exhaust gas is treated by the catalyst reducing the nitrogen oxides (NOx) compounds therein.

* * * * *

UNITED STATES PATENT AND TRADEMARK OFFICE
CERTIFICATE OF CORRECTION

PATENT NO. : 8,609,575 B2  
APPLICATION NO. : 12/296896  
DATED : December 17, 2013  
INVENTOR(S) : Talbot et al.

Page 1 of 1

It is certified that error appears in the above-identified patent and that said Letters Patent is hereby corrected as shown below:

In the Claims

Column 11:  
Line 44 (claim 1, line 20), change "$0 \leq y < 5$" to -- $0 \leq y < 0.5$ --.

Column 12:  
Line 38 (claim 14, line 2), change "$La_{0.9}SR_{0.2}Ti_{0.9762}Pd_{0.0117}Rh_{0.0121}O_n$ plus 10% $CeO_2$" to -- $La_{0.8}SR_{0.2}Ti_{0.9762}Pd_{0.0117}Rh_{0.0121}O_n$ plus 10% $CeO_2$ --.

Signed and Sealed this  
Twenty-fifth Day of February, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,609,575 B2  Page 1 of 1
APPLICATION NO. : 12/296896
DATED : December 17, 2013
INVENTOR(S) : Talbot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 950 days.

Signed and Sealed this
Twenty-second Day of September, 2015

Michelle K. Lee
*Director of the United States Patent and Trademark Office*